Figure 1:
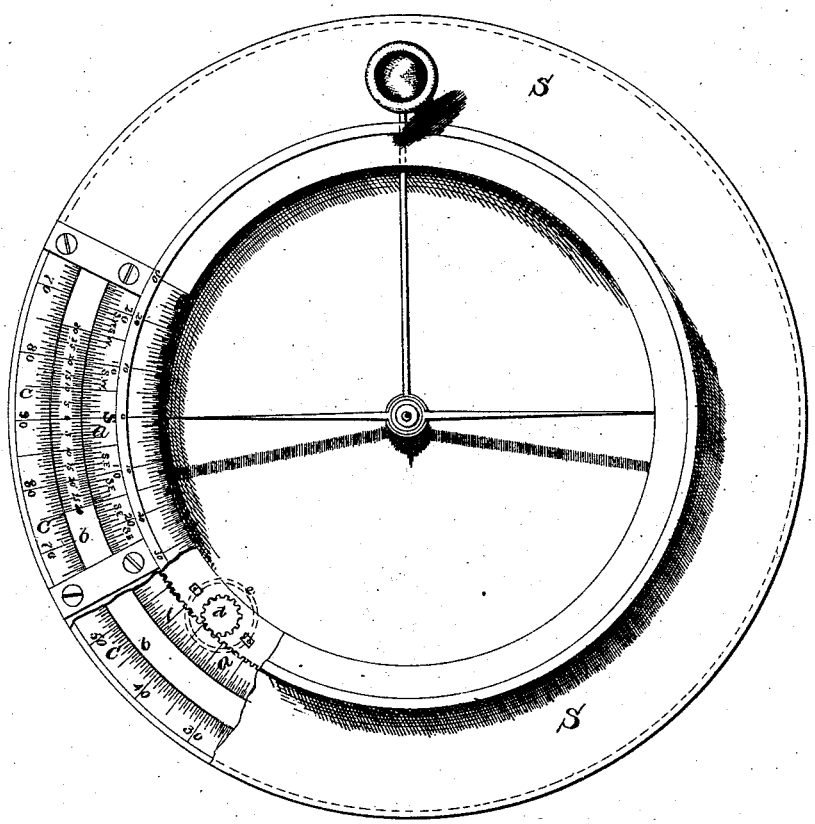

(No Model.) 2 Sheets—Sheet 1.

T. L. NIXON.
SURVEYOR'S AND ENGINEER'S TRANSIT.

No. 293,667. Patented Feb. 19, 1884.

Witnesses:
E. F. Murdock
A. G. Heylmun

Inventor:
Thomas L. Nixon
per D. C. Lancaster
Attorney.

(No Model.) 2 Sheets—Sheet 2.

T. L. NIXON.
SURVEYOR'S AND ENGINEER'S TRANSIT.

No. 293,667. Patented Feb. 19, 1884.

Witnesses:
E. F. Murdock
A. G. Heylmun

Inventor:
Thomas L. Nixon
per C. A. Lancaster
Attorney.

UNITED STATES PATENT OFFICE.

THOMAS LEA NIXON, OF NEW TACOMA, WASHINGTON TERRITORY.

SURVEYOR'S AND ENGINEER'S TRANSIT.

SPECIFICATION forming part of Letters Patent No. 293,667, dated February 19, 1884.

Application filed August 27, 1883. (No model.)

*To all whom it may concern:*

Be it known that I, THOMAS LEA NIXON, a citizen of the United States, residing at New Tacoma, in the county of Pierce and Territory of Washington, have invented certain new and useful Improvements in the Construction of Surveyors' or Engineers' Transits, which I have described as "Nixon's Course Reading Attachment to Surveyors' or Engineers' Transits;" and I do hereby declare that the following is a full, clear, and exact description of the invention, which will enable others skilled in the art to which it appertains to make and use the same.

Heretofore the transit of a surveyor or engineer has consisted, chiefly, in two circular plates of metal revolving upon each other and around the common spindle, the lower plate having a graduated circle so constructed upon it as to admit of a vernier, which is attached to the upper plate, revolving either immediately inside or outside of said graduated circle on lower plate, their upper surfaces being on the same plane, and thus the desired angle can be read by noticing the coincident graduations of each.

With the present construction of the transit thus described it is necessary, in order to run meander or preliminary lines, to proceed as follows, namely:

First. Upon setting up and leveling the instrument over the initial point, the zero of the vernier of the transit is placed at zero of the graduations on the lower plate and the upper and lower plate firmly clamped together by the clamp-screw. A sight is then taken through the telescope of the instrument upon some established or assumed cardinal course, and the entire instrument clamped upon the spindle, which is connected with the tripod. The clamp-screw which binds the upper and lower plates together is then loosened and the telescope, which is firmly attached to the upper plate, is reversed and directed toward the desired point to which the line is to be extended. The revolving of the telescope revolves the upper plate, to which the vernier is attached; consequently, by examination of the graduations upon the vernier coincident with the graduations upon the lower plate the angle subtended by the backsight and the foresight is determined.

Secondly. This angle, so determined, must be either added to or subtracted from the preceding course, as the case may be, in order to give the proper cardinal course of the new line just produced. In case the addition of the subtended angle to the former or preceding course should result in a sum greater than ninety (90) degrees, it becomes necessary to subtract the result from one hundred and eighty (180) degrees, because the deflection has passed either the east or the west point of the graduations upon the lower plate, and has entered a quadrant other than that in which was the preceding course. The remainder must then be expressed in proper characters, denoting said quadrant in the note-book. In case the subtraction of the subtended angle from the preceding course would produce a result less than zero, then the preceding course must be subtracted from the subtended angle, because the deflection has passed either the north or the south point of the graduations upon the lower plate and entered a quadrant other than that in which was the preceding course, and the remainder must be expressed in characters denoting said quadrant in the note-book.

Thirdly. In locating curves by deflection-angles the course of any deflection-line cannot be obtained without tedious calculations, and extreme care is required in obtaining a check upon the magnetic needle at any point upon the curve. These numerous calculations are the source of many errors, more especially when the deflections upon either meander or preliminary lines are small, and the several succeeding courses may be oscillating from one quadrant to another.

Fourthly. The magnetic needle is placed upon transits, to be used as a check upon the calculated courses; but in case of local attraction, and without the most rigid care, the check is not wholly reliable. It may be used, however, as an absolute check upon calculations by referring to the note-book at every new point upon the line, and the difference of the reading of the needle at that point with that of the preceding point noted. Then, upon determining the new course in the manner described above the same difference should appear if the calculations are correct and the needle is in order; but this continual reference to the note-book and the recording of small differences are tedious and consume much valuable time.

The main object of the present invention is to provide a surveyor's instrument, by the use of which the difficulties and errors above noted in the work of producing angle-lines by the instruments at present employed are entirely obviated and much time and trouble saved.

The subject-matter claimed is first fully described and is then particularly pointed out at the close of this specification. Some of the improvements claimed by me may be used without the others.

In the accompanying drawings I have shown so much of a surveyor's transit with my improvements embodied therein as is necessary to an understanding of my present improvements.

Figure 2:
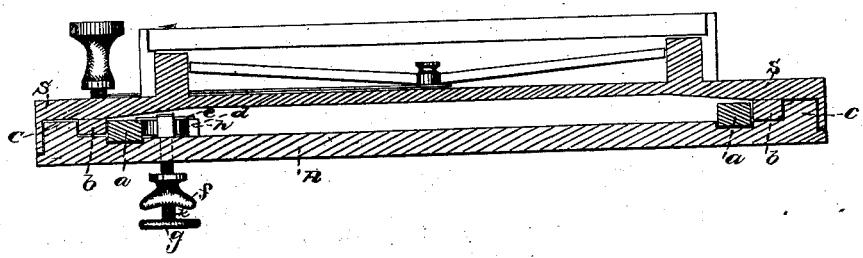
Figure 3:
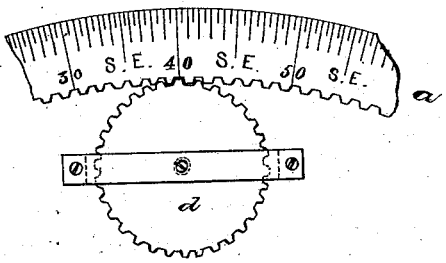
Figure 4:
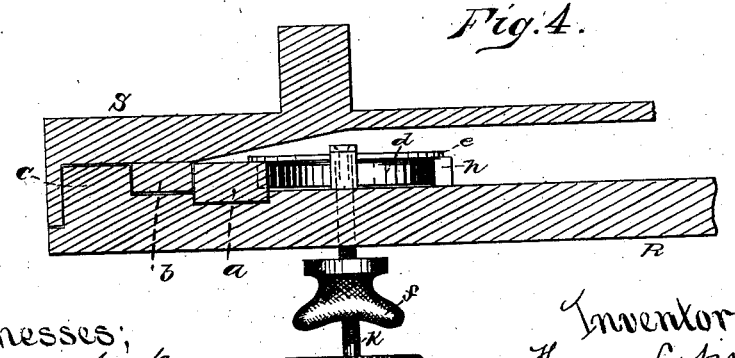

In said drawings, Figure 1 is a view of a portion of the instrument. Fig. 2 is a section through a portion thereof on an enlarged scale. Fig. 3 is a similar view to Fig. 2 on a smaller scale, and Fig. 4 is a plan or top view of as much of the instrument as is necessary to the improvements, a portion of the instrument being broken away to more clearly show the parts beneath.

A graduated ring, $a$, rests on or is guided upon the lower plate, R, of the transit. Said ring $a$ is fitted to revolve on said plate R, and the revolving or turning movements of said ring are preferably accomplished by means of a pinion, $d$, the teeth of which mesh with similar teeth on the inner edge of said ring. To conveniently turn said pinion, it is rigidly mounted on a spindle, K, extended through the lower plate, R, (in which it has a bearing,) and provided at its lower end with a thumb wheel or knob, $g$, by which the spindle and pinion may be readily turned. Said spindle K is screw-threaded, and a jam-nut, $f$, is fitted thereon, whereby the graduated course-ring $a$ may be clamped in any position desired by adjusting or turning said jam-nut so as to bear against the under surface of the plate R and force up or draw down upon the upper surface of said ring $a$ the projecting rim of a plate, $e$, forming part of the pinion-wheel $d$.

It will be obvious that when the spindle K is drawn down by tightening the nut $f$ that the pinion $d$ and ring $a$ will be tightly clamped together and upon the upper surface of said plate R.

In order to avoid injury to the spindle or binding of the parts by the tightening operation of the nut $f$, I provide a block or bearing-surface, $h$, on the upper surface of the plate R, against which the side of the rim of the plate $e$ opposite that which bears upon the ring $a$ is brought when the nut is screwed up to clamp the parts. (The object of the graduated course-ring $a$ and the above construction of parts will presently appear.) A vernier, $b$, is attached to the upper plate, S, of the instrument, and is fitted to travel immediately outside of the graduated ring $a$ and immediately inside of a graduated circle, $c$, of the lower plate, R, of the transit. The vernier is graduated to read minutes or half-minutes, as desired, and the graduations extend to both edges, so that the vernier will read precisely the same angle upon either the graduated circle $c$ or the course-ring $a$.

I have described the graduated course-reading ring $a$ as resting and turning upon the lower plate, R, of the transit. It will be understood that the ring may be guided in a suitable groove or recess in said plate, as shown in the drawings, or otherwise mounted, so as to be capable of revolving or being turned relatively to said plate R.

The advantageous operation of my improved instrument is as follows:

First. In running angle-lines, after setting up and leveling the transit over the initial point, the zero of the vernier $b$ is placed identical with the course of the preceding or assumed line upon the course-ring $a$. A telescope is directed to a point on said preceding or assumed line and the instrument clamped on the spindle. The telescope is then reversed and the clamp-screw holding the upper and lower plates is loosened, and the telescope directed to any desired point, and the upper and lower plate clamped. The angle being now turned off, the vernier $b$ will show the course of the new line upon the course-ring $a$ without any calculations whatever.

Secondly. It is apparent from the foregoing description that at all times the vernier $b$ will read the course on which any line is being produced. It is also evident that the relation between the course of any line and the course indicated by the magnetic needle can be noted at all times, and a continual check had upon the work without any reference to the note-book.

Thirdly. In the location of curves by deflection-angles it is necessary, at the beginning of all curves, that the zero of the vernier $b$ be set identical with the course of the immediately-preceding tangent on the course-ring $a$, and also identical with the zero of the graduated circle $c$ of the lower plate, R. A sight is then taken backward upon the preceding tangent and the instrument clamped. The telescope is then reversed and the curve set off in the usual manner. The individual deflections being set off on the graduated circle $c$, the course of each and every deflection is at once shown upon the course-ring $a$ without any calculations whatever, and with a free needle a continual check is had upon the work throughout the entire curve.

What I claim as new, and desire to secure by Letters Patent, is—

1. The combination, with a surveyor's transit, of a graduated course-ring, $a$, having gear-teeth in the edge thereof, the pinion meshing with said teeth, the clamp-plate of said pinion, the spindle carrying said pinion and clamp-plate, and a tightening or clamp nut fitted to threads upon said spindle, substantially as described.

2. The combination, in a surveyor's transit, of the graduated circle $c$, the graduated ring $a$, and the vernier $b$, between said circle and ring, having double graduations extending to both edges thereof, substantially as described.

August 6, 1883.

THOMAS LEA NIXON.

In presence of—
   JOHN ARTHUR,
   ELWOOD EVANS.